(12) United States Patent
Fallon

(10) Patent No.: US 10,730,264 B2
(45) Date of Patent: Aug. 4, 2020

(54) BRIDGE TAPE

(71) Applicant: TESA SE, Norderstedt (DE)

(72) Inventor: Robert Fallon, New Hudson, MI (US)

(73) Assignee: TESA SE, Norderstedt (DE)

( * ) Notice: Subject to any disclaimer, the term of this patent is extended or adjusted under 35 U.S.C. 154(b) by 107 days.

(21) Appl. No.: 15/551,784

(22) PCT Filed: Feb. 23, 2016

(86) PCT No.: PCT/EP2016/053746
§ 371 (c)(1),
(2) Date: Aug. 17, 2017

(87) PCT Pub. No.: WO2016/135128
PCT Pub. Date: Sep. 1, 2016

(65) Prior Publication Data
US 2018/0022062 A1    Jan. 25, 2018

Related U.S. Application Data

(60) Provisional application No. 62/119,525, filed on Feb. 23, 2015.

(51) Int. Cl.
*B32B 5/18* (2006.01)
*B32B 7/12* (2006.01)
(Continued)

(52) U.S. Cl.
CPC .............. *B32B 5/18* (2013.01); *B32B 5/022* (2013.01); *B32B 5/024* (2013.01); *B32B 5/026* (2013.01); *B32B 5/20* (2013.01); *B32B 5/26* (2013.01); *B32B 7/06* (2013.01); *B32B 7/12* (2013.01); *B32B 27/065* (2013.01); *B32B 27/12* (2013.01); *B32B 27/34* (2013.01); *B32B 27/38* (2013.01); *B32B 27/40* (2013.01); *B32B 27/42* (2013.01); *C09J 7/29* (2018.01); *B32B 2255/02* (2013.01); *B32B 2255/26* (2013.01); *B32B 2262/062* (2013.01); *B32B 2270/00* (2013.01);
(Continued)

(58) Field of Classification Search
CPC .... B32B 5/18; B32B 5/20; B32B 5/26; B32B 5/022; B32B 5/024; B32B 5/026
USPC .................................... 264/41, 46.5
See application file for complete search history.

(56) References Cited

U.S. PATENT DOCUMENTS 4,204,373 A    5/1980    Davidson
4,397,914 A    8/1983    Miura et al.
(Continued)

FOREIGN PATENT DOCUMENTS

CN    1938187 A    3/2007
CN    101126011 A    2/2008
(Continued)

OTHER PUBLICATIONS

Korean Office Action dated Nov. 21, 2018 in Korean Patent Application No. 2017-7026852.
(Continued)

*Primary Examiner* — Christina A Johnson
*Assistant Examiner* — Xue H Liu
(74) *Attorney, Agent, or Firm* — Norris McLaughlin, P.A.

(57) ABSTRACT

Bridge tape comprised of thermally foamable composition, useful for applying coating material through holes in the tape to a substrate beneath the tape, after which the holes can be sealed by heating to cause the foamable composition to foam and expand the foam to seal the holes.

5 Claims, 2 Drawing Sheets

(51) Int. Cl.
- *B32B 27/38* (2006.01)
- *B32B 27/34* (2006.01)
- *B32B 27/06* (2006.01)
- *B32B 7/06* (2019.01)
- *B32B 27/40* (2006.01)
- *B32B 5/02* (2006.01)
- *B32B 27/42* (2006.01)
- *B32B 5/20* (2006.01)
- *B32B 27/12* (2006.01)
- *B32B 5/26* (2006.01)
- *C09J 7/29* (2018.01)

(52) U.S. Cl.
CPC ....... *B32B 2307/31* (2013.01); *B32B 2307/58* (2013.01); *B32B 2307/732* (2013.01); *B32B 2307/748* (2013.01); *B32B 2405/00* (2013.01); *B32B 2556/00* (2013.01); *B32B 2581/00* (2013.01); *C09J 2201/20* (2013.01); *C09J 2205/106* (2013.01); *C09J 2205/11* (2013.01); *C09J 2400/263* (2013.01)

(56) References Cited

U.S. PATENT DOCUMENTS

| | | |
|---|---|---|
| 5,846,622 A | 12/1998 | Imaeda |
| 6,672,597 B1 | 1/2004 | Irrgeher et al. |
| 8,241,721 B2 | 8/2012 | Deiss |
| 8,318,280 B2 | 11/2012 | Deiss |
| 8,329,275 B2 | 12/2012 | Deiss |
| 8,349,426 B2 | 1/2013 | Deiss |
| 8,551,594 B2 | 10/2013 | Deiss |
| 8,764,024 B2 | 7/2014 | Deiss |
| 9,540,802 B2 | 1/2017 | Deiss |
| 10,480,656 B2 | 11/2019 | Fallon et al. |
| 2007/0207306 A1 | 9/2007 | Broughton et al. |
| 2008/0029919 A1 | 2/2008 | Howe et al. |
| 2008/0099944 A1 | 5/2008 | Lipprandt et al. |
| 2011/0143121 A1 | 6/2011 | Deiss |
| 2011/0143122 A1 | 6/2011 | Deiss |
| 2018/0051808 A1 | 2/2018 | Fallon et al. |

FOREIGN PATENT DOCUMENTS

| | | |
|---|---|---|
| EP | 1 154 002 A1 | 11/2001 |
| EP | 1 889 715 A1 | 2/2008 |
| JP | S 57-151345 A | 9/1982 |
| JP | S57-151345 A | 9/1982 |
| JP | 2007532382 A | 11/2007 |
| JP | 2008044368 A | 2/2008 |
| KR | 10 2007 0012463 A | 1/2007 |
| KR | 10 2008 0015718 A | 2/2008 |
| WO | 2005/097582 A1 | 10/2005 |

OTHER PUBLICATIONS

International Search Report dated Apr. 22, 2016, dated May 4, 2016.
"Handbook of Pressure Sensitive Adhesive Technology" by Donatas Satas (van Nostrand, 1989).
English translation Japanese Office Action corresponds to Japanese application No. 2017-5445801 dated Jul. 20, 2018.
Office Action dated Oct. 21, 2019, issued in connection with Chinese Patent Application No. 201680011632.5.

BRIDGE TAPE

This is a 371 of PCT/EP2016/053746 filed 23 Feb. 2016, which claims priority benefit of Provisional Patent Application 62/119,525 filed 23 Feb., 2015, the entire contents of which are incorporated herein by reference.

The present invention pertains to a bridge tape and the use of the bridge tape for permanently sealing openings, such as holes, especially in metal sheets or plastic parts of automobile bodies, before or after the so-called e-coating of such metal sheets or plastic parts.

In the present state of the art, OEM (Original Equipment Manufacturers) of automobile vehicles need to seal openings, such as holes and seams in the vehicles against entry into the opening of a variety of environmental elements, such as water, dirt, and the like, in order to help avoid corrosion and noise. For most applications putty, a pumpable material, plugs, Butyl or other types of sealing patches are used. However, most of these materials must be applied after e-coat in order to allow the inner cavities to be coated before sealing the cavities off as desired.

Some of the materials used for this purpose will shrink when the e.g. automobile body is passed through a paint drying oven as part of the final finish of the automobile body, and such shrinkage can create a leak into the previously-sealed opening.

Furthermore, some of the openings that need to be sealed are in areas that are not accessible after the vehicle has been welded together.

It is an object of the present invention to overcome the foregoing difficulties, by providing a sealant tape that can be applied to such openings either before or after e-coating, which will allow e-coating of the cavities inside the openings even after the sealant tape has been applied over the openings, and subsequently provide an effective seal for such openings.

In accordance with the present invention, there is provided a bridge tape which can be die cut to form patches of appropriate sizes to cover such openings, and which, if applied prior to e-coating of the sheet metal or plastic part, allows for the passing of e-coat fluid through the patch and into the cavities, and also through which excess e-coating fluids can drain out of said cavities.

The bridge tape of the present invention is constructed of a fabric backing having an adhesive coating, or followed by a two-sided adhesive tape, i.e., a "transfer tape", a layer of a foamable composition with a layer of adhesive or adhesive promoter. The tape is perforated with a plurality of holes, if it is to be applied prior to e-coating, to allow for passing of the e-coat fluid through the holes.

When a patch of the bridge tape is applied over an opening in the sheet metal or plastic part, e-coating fluid can pass through the holes in the patch and into the cavity under the opening.

When the thus treated sheet metal or plastic part is subjected to heat treatment, such as occurs during the oven drying of the e-coat or paint, the foamable composition foams and expands to close off all of the holes in the patch, if present, as well as expands over all of the edges of the tape/patch to seal the edges and bond the die-cut patch to the body of the sheet metal substrate or plastic part.

In a similar manner, the tape patch can be applied to a gap in a sheet metal or plastic substrate, and then heat treated to expand the foam and seal the gap.

BRIEF DISCUSSION OF THE DRAWINGS

The construction of several embodiments of the bridge tape of the present invention is illustrated in the following figures, in which FIG. 1 illustrates a side view of a section of the bridge tape of the present invention having the following layers:
Layer 1 is a layer of a foam foamable composition,
Layer 2 is a layer of an adhesion promoter,
Layer 3 is a two-sided tape,
Layer 4 is an adhesive coated fabric liner, and
Layer 5 is a release liner on the adhesive coated fabric liner.

DETAILED DESCRIPTION

Figure 1:
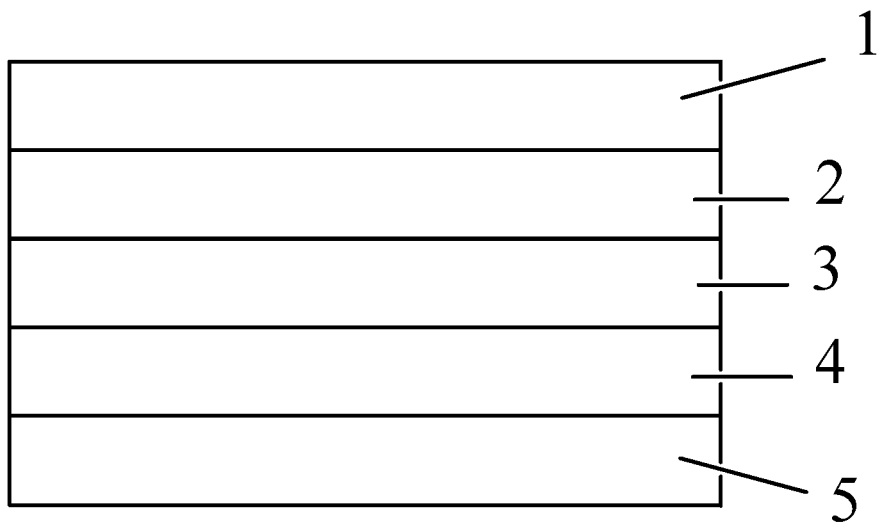

As shown in FIG. 1, the bridge tape is formed of a layer of a foamable composition adhered to a backing material, such as a cloth liner having an adhesive coating or layer of a transfer tape, and a release liner over the adhesive coating or transfer tape.

As backing material for the bridge tape of the present invention it is possible to use all known textile backings, such as wovens, knits or nonwoven webs; the term "nonwoven web" embraces at least textile sheetlike structures as well as stitchbonded nonwovens and similar systems. It is likewise possible to use spacer fabrics, including wovens and knits, with lamination.

A preferred backing material comprises woven cotton fabric, typically having a mesh count in the range of 140 to 160, preferably 148 (implying a warp thread count of 74 and a weft thread count of 74).

With further preference the weft count is 70 to 80 and/or the warp count is 70 to 80.

As adhesives on the backing it is possible in principle to choose a variety of polymer systems, with natural-rubber or synthetic-rubber and also acrylate systems having proven particularly advantageous if their adhesive properties and temperature stabilities are in accordance with the requirements. With further preference the bond strength to steel is at least 5 N/25 mm.

A suitable adhesive is one based on acrylate hotmelt which has a K value of at least 20, in particular more than 30 (measured in each case in 1% strength by weight solution in toluene, 25.degree. C.), obtainable by concentrating a solution of such an adhesive to give a system which can be processed as a hotmelt.

It is also possible to use an adhesive comprised of natural rubbers or synthetic rubbers or of any desired blend of natural rubbers and/or synthetic rubbers, it being possible to select the natural rubber or the natural rubbers in principle from all available grades, such as, for example, crepe, RSS, ADS, TSR or CV grades, depending on the required purity and viscosity level, and to select the synthetic rubber or synthetic rubbers from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate (EVA) copolymers and polyurethanes and/or blends thereof.

With further preference it is possible to add thermoplastic elastomers to the rubbers, in order to improve the processing properties, with a weight fraction of from 10% to 50% by weight, based on the total elastomer fraction.

As representatives mention may be made at this point in particular of the especially compatible styrene-isoprene-styrene (SIS) and styrene-butadiene-styrene (SBS) products.

Tackifying resins which can be used include without exception all tackifier resins which are already known and have been described in the literature. As representatives mention may be made of the rosins, their disproportionated, hydrogenated, polymerized, and esterified derivatives and salts, the aliphatic and aromatic hydrocarbon resins, terpene resins and terpene-phenolic resins. Any desired combinations of these and further resins may be used in order to adjust the properties of the resultant adhesive in accordance with requirements. Express reference may be made to the depiction of the state of the art in the "Handbook of Pressure Sensitive Adhesive Technology" by Donatas Satas (van Nostrand, 1989).

Heat-activatable adhesive sheets may be used for the adhesive layer on the backing layer. Such heat-activatable adhesive sheets preferably have the following composition: i) a polymer, with a fraction of at least 30% by weight, a first section of the heat-activatable adhesive sheet being based with particular preference on reactive polyurethane, polyamide, nitrile rubber with reactive phenolic resins or reactive epoxy resins, and/or a second section being based on thermoplastic, non-reactive polyamides or epoxides, ii) one or more tackifying resins, with a fraction of 5% to 50% by weight, and/or iii) epoxy resins with hardeners, and accelerators, if desired, with a fraction of 5% to 40% by weight.

The adhesive sheets preferably have a thickness of from 10 to 500 µm.

The compositions for the adhesive sheet can be widely varied by changing the type and proportion of raw materials. It is also possible to obtain further product properties such as, for example, color, thermal conductivity or electrical conductivity, by means of selective additions of dyes, mineral and/or organic fillers, silicon dioxide for example, and/or powders of carbon and/or of metal.

The foamable layer is preferably formed of a foamable polyurethane composition or of an EVA (ethylene vinyl acetate), with a blowing agent, having a layer thickness prior to expansion of from about 1.5 to about 4 mm and comprising a foaming agent. A particularly preferred expandable foam is that formed of ethylene copolymers and available from ND Industries, Inc. under the product name NB169P041.

These materials are laminated together to form the bridge tape of the present invention. Once formed, the bridge tape is die cut to the size required for the particular use, and, if necessary, holes punched through it.

Figure 2:
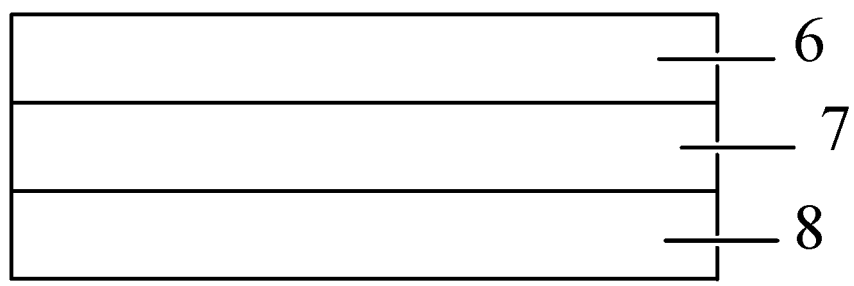
FIG. 2 illustrates an alternative embodiment of the bridge tape of the invention, in which:
Layer 6 is a layer of a foamable composition,
Layer 7 is a layer of backing material, such as an adhesive coated fabric liner, and
Layer 8 is a release liner on the adhesive coated side of the fabric liner.
Figure 3:
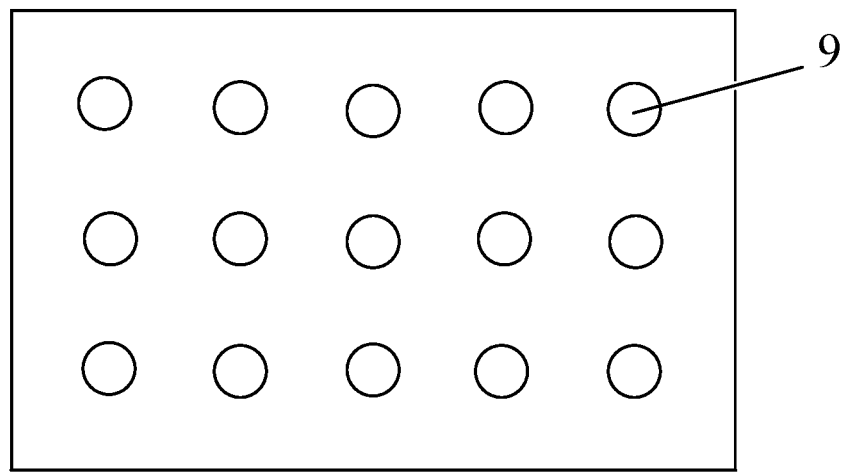
FIG. 3 illustrates the top view of the bridge tape patch of FIG. 2, after holes (9) have been punched into it.
Figure 4:
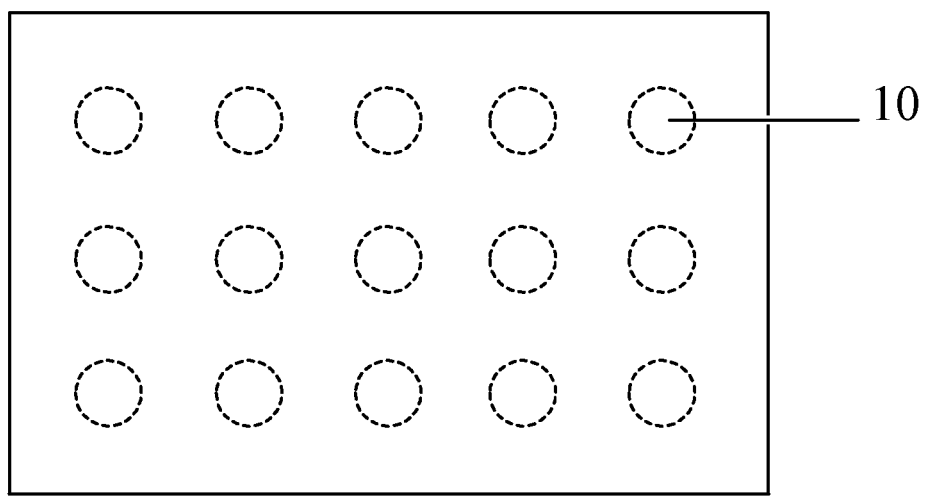
FIG. 4 illustrates the bridge tape patch of FIG. 3, after it has been subjected to heat treatment to cause the foamable composition to foam and expand the foam to seal the holes, the sealed holes being illustrated in outline (10).

FIG. 2 illustrates a further embodiment of the bridge tape of the present invention, in which the foamable composition (6) has been extruded directly onto the backing layer (7), such as an adhesive coated fabric with a release liner (8).

The invention claimed is:

1. A bridge tape comprising:
   a first layer comprising a foamable composition;
   a second layer comprising a backing material;
   a third layer comprising an adhesive coating; and
   a plurality of holes passing through the bridge tape,
   wherein the second layer is disposed between the first layer and the third layer.

2. The bridge tape of claim 1, wherein the bridge tape has been die-cut to form a die-cut patch.

3. The bridge tape of claim 1, wherein the backing material comprises a cloth tape.

4. The bridge tape of claim 3, wherein the adhesive coating comprises a two-sided adhesive tape.

5. The bridge tape of claim 3, further comprising a release liner disposed on the third layer, wherein the third layer is disposed between the second layer and the release liner.

* * * * *